United States Patent [19]

Imogawa et al.

[11] Patent Number: 5,063,861
[45] Date of Patent: Nov. 12, 1991

[54] CERAMIC FIBER FURNACE

[75] Inventors: Keikichi Imogawa, Ichinomiya; Kazuo Nakasako, Nagoya, both of Japan

[73] Assignee: NGK Insulators, Ltd., Aichi, Japan

[21] Appl. No.: 666,441

[22] Filed: Mar. 11, 1991

Related U.S. Application Data

[63] Continuation of Ser. No. 565,672, Aug. 10, 1990, abandoned.

[30] Foreign Application Priority Data

Aug. 11, 1989 [JP] Japan .................. 1-208664

[51] Int. Cl.⁵ .............................. F23M 5/00
[52] U.S. Cl. ................................ 110/336; 52/410; 52/512
[58] Field of Search ............. 110/336; 432/248; 52/410, 512, 509, 511

[56] References Cited

U.S. PATENT DOCUMENTS

| 4,432,989 | 2/1984 | Norman et al. | 110/336 |
| 4,633,636 | 1/1987 | Alexander | 52/512 |
| 4,959,012 | 9/1990 | Perfetti | 110/336 X |

FOREIGN PATENT DOCUMENTS 535702 3/1980 Australia .
2375476 12/1977 France .
58-32136 7/1983 Japan .

Primary Examiner—Edward G. Favors
Attorney, Agent, or Firm—Parkhurst, Wendel & Rossi

[57] ABSTRACT

An excellent ceramic fiber furnace is provided which prevents formation or peeling-off of minute ceramic fibers from a ceramic fiber board of the furnace caused by elevation or lowering of the furnace temperature. As a result, firing methods of using a muffle furnace, a reflector system or a brick wall furnace, etc., which necessitate a large heat source and which have inferior heat efficiencies and small temperature-raising or lowering rates, need not be used, so that investment cost and running cost can be decreased, firing of ceramic products is facilitated, the quality of the ceramic products is improved, and the firing time of the ceramic products can be decreased. The ceramic fiber furnace has a furnace wall of a structure composed of a substrate member, a wall of ceramic fibers applied on the inner surface of the substrate member, a ceramic fiber board applied on the inner surface of the wall of the ceramic fibers, and a ceramic pin penetrating through the furnace wall, comprising a ceramic plate interposed between the ceramic nut and the ceramic board, the ceramic plate having a penetration hole which has a larger diameter than the diameter of the ceramic pin for allowing free displacement of the ceramic pin therein.

5 Claims, 3 Drawing Sheets

CERAMIC FIBER FURNACE

This is a continuation of application Ser. No. 07/565,672 filed Aug. 10, 1990, now abandoned.

BACKGROUND OF THE INVENTION

1. Field of the Invention

The present invention relates to ceramic fiber furnaces.

2. Related Art Statement

Recently, ceramic fiber furnaces using ceramic fibers as their walls have been widely used in producing ceramic products, owing to their good thermal efficiency and high temperature-raising rate. An ordinary wall structure of such ceramic fiber furnaces is composed of a substrate member 12, such as steel plate, a wall of ceramic fibers 11 applied on the inner surface of the substrate member 12, a ceramic fiber board 13 applied on the inner surface of the wall of the ceramic fibers 11, and a ceramic pin 14 penetrating through the substrate member 12, the wall of the ceramic fibers 11, and the ceramic fiber boards 13 for fixing the same by means of a spring 16, as shown in FIG. 4. The ceramic pin 14 has a ceramic nut 15 threaded therewith at the inner end thereof at the inside of the ceramic fiber furnace, a spring-supporting nut 10 at the outer end thereof, and a spring 16 engaged therewith and held by the nut 10 at the outside of the ceramic fiber furnace. The spring 16 exerts an outwardly directed resilient power on the ceramic pin 14, so that the ceramic nut 15 presses the ceramic fiber board 13 outwardly from the inside of the ceramic fiber furnace.

However, the ceramic pin 14 and the ceramic nut 15 of the wall structure of the conventional ceramic fiber furnaces are expanded and deformed at high temperatures to a position as shown by the imagination line in FIG. 2, for example, and shrunk and retracted at low temperatures to their original position as shown by the solid line in FIG. 2. Therefore, the ceramic nut 15 is displaced on the surface of the ceramic fiber board 13 in contact therewith, so that minute ceramic fibers are peeled off from the surface of the ceramic fiber board 13. Particularly, such minute ceramic fibers which peeled off from the ceramic fiber board 13 are spread and adhered on the glazed surface, etc., of the fired products to cause an insufficient firing.

Therefore, in case when firing ceramic products which dislike the adhesion of the minute ceramic fibers, there are adopted such methods as, firing in a muffle furnace, firing by a reflector system, or firing in a furnace of bricks walls. However these furnaces have drawbacks in that they need a large heat source as compared with those of ceramic fiber furnaces, that heat efficiency is bad, and that the temperature-raising rate is small, etc.

SUMMARY OF THE INVENTION

An object of the present invention is to obviate the above problems and drawbacks.

Another object of the present invention is to provide a ceramic fiber furnace which can prevent formation or peeling-off of the minute ceramic fibers from the ceramic fiber board of the ceramic fiber furnace.

The present invention is a ceramic fiber furnace having a furnace wall of a structure composed of a substrate member, a wall of ceramic fibers applied on the inner surface of the substrate member, a ceramic fiber board applied on the inner surface of the wall of the ceramic fibers, and a ceramic pin penetrating through the furnace wall, comprising a ceramic plate interposed between the ceramic nut and the ceramic fiber board, the ceramic plate having a penetration hole which has a larger diameter than the diameter of the ceramic pin for allowing free displacement of the ceramic pin therein.

BRIEF DESCRIPTION OF THE DRAWING

For a better understanding of the present invention, reference is made to the accompanying drawings, in which.

Numberings in the drawings

Figure 1:
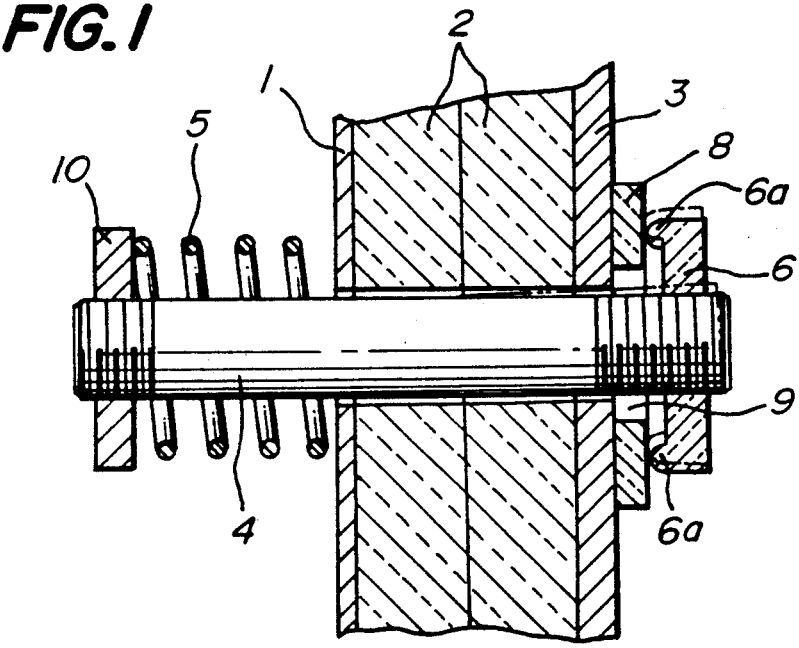
FIGS. 1 and 2 is a cross-sectional view of an embodiment of the present invention, respectively.

1 ... substrate member
2 ... ceramic fibers
3 ... ceramic fiber board
4 ... ceramic pin
5 ... spring
6 ... ceramic nut
6a ... leg of the ceramic nut 6
6b ... groove of the ceramic nut 6
8 ... ceramic plate
8a ... leg of the ceramic plate 8
8b ... groove of the ceramic plate 8
9 ... hole of the ceramic plate 9
10 ... spring-supporting nut
11 ... ceramic fibers
12 ... substrate member
13 ... ceramic fiber board
14 ... ceramic pin
15 ... ceramic nut
16 ... spring

DESCRIPTION OF THE PREFERRED EMBODIMENTS

Hereinafter, the present invention will be explained in more detail with reference to the embodiments shown in the drawings.

Figure 2:
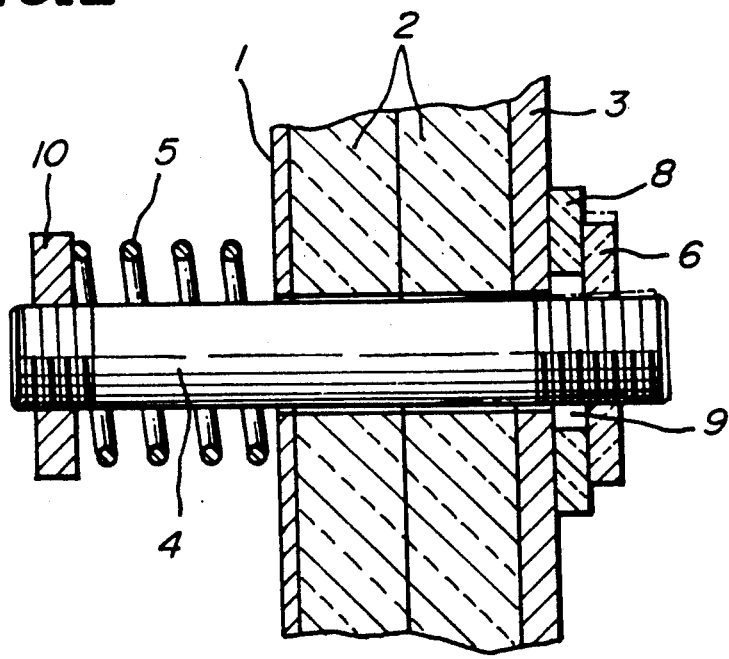

In FIGS. 1-3, reference numeral 1 is a substrate member, such as steel plate, reference numeral 2 is a layer of ceramic fibers arranged on the inner side of the substrate member 1, reference numeral 3 is a ceramic fiber board provided on the inner surface of the ceramic fibers layers 2, reference numeral 4 is a ceramic pin penetrating through the wall of the ceramic fiber furnace, and reference numeral 5 is a spring 5 arranged on the outer surface of the wall of the ceramic fiber furnace for affording a outwardly directed resilient power to the ceramic pin 4. The ceramic pin 4 has a threaded portion at the inner end at the inner side of the ceramic fiber furnace, which threadably engages with a ceramic nut 6.

Figure 4:
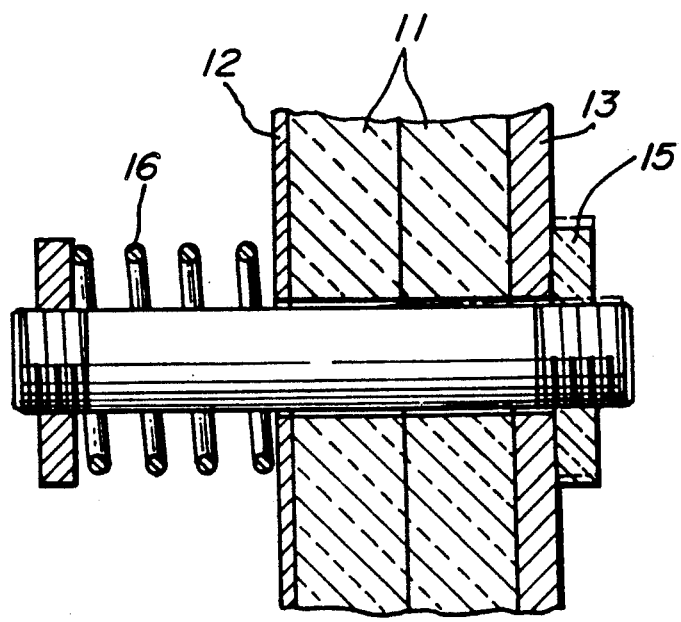
FIG. 4 is a cross-sectional view of the wall structure of a conventional ceramic fiber furnace.

In the first embodiment shown in FIG. 1, the ceramic nut 6 has a plural protrusions for example, three legs 6a protruded from the outer surface therefrom. In contrast to the direct pressing of the ceramic fiber board 13 by the ceramic nut 15 of the prior furnace wall structure as shown in FIG. 4, a ceramic plate 8 is interposed between the ceramic fiber board 3 and the ceramic nut in the present invention. As shown in FIG. 1, the interposing ceramic plate 8 has a bore or hole 9 which has a diameter sufficiently larger than the outer diameter of the ceramic pin 4, so that the ceramic pin 4 does not abut on the ceramic plate 8 even when the ceramic pin 4 is displaced to a large extent by heating. Reference numeral 10 is a spring-supporting nut.

Figure 3A:
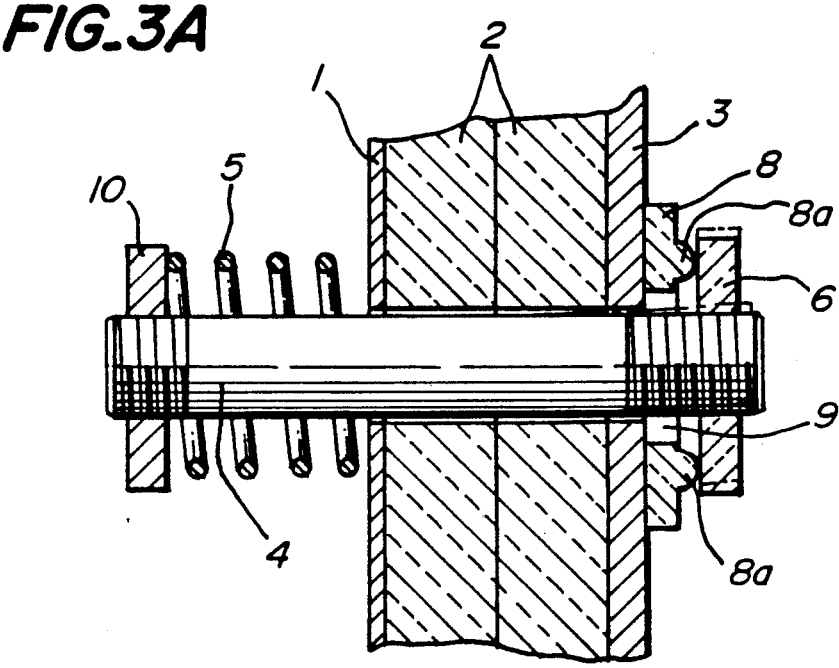
FIGS. 3A, 3B and 3C is a cross-sectional partial view of another embodiment of the present invention, respectively.
Figure 3B:
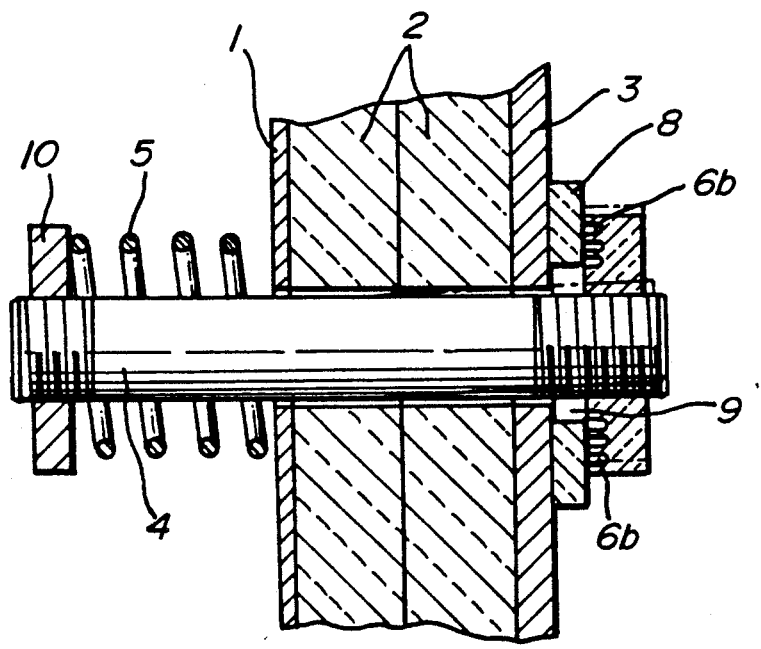
Figure 3C:
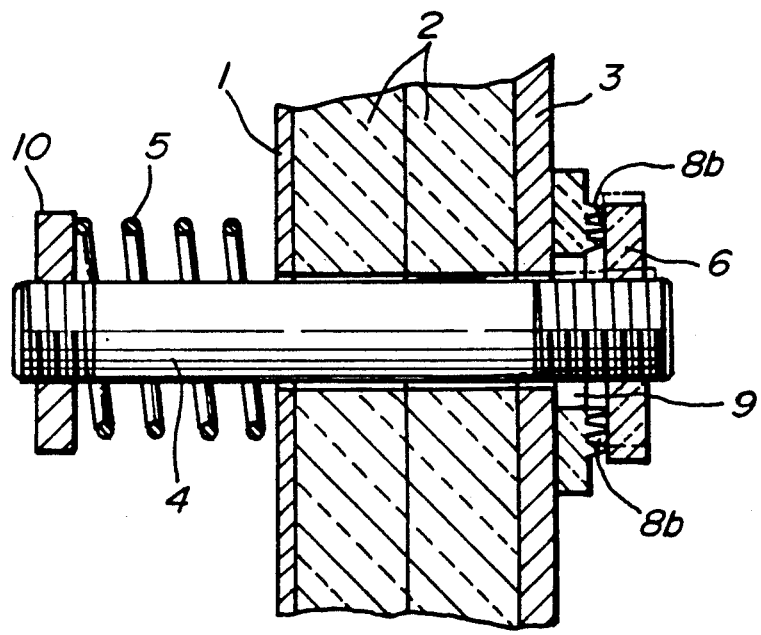

If the ceramic nut 6 is constituted to slide on the surface of the ceramic plate 8 by, for example, having a smooth surface, the ceramic nut 6 needs not have the legs 6a, and the ceramic nut 6 can be of a plate shaped as shown in FIG. 2. In this embodiment, the ceramic plate 8 may also have a smooth inner surface. Alternatively, the ceramic plate 8 can have legs 8a as shown in FIG. 3A, or the ceramic nut 6 or the ceramic plate 8 can have at least one recess or groove 6b or 8b, respectively, for assisting the sliding of the ceramic nut 6 on the ceramic plate 8, as shown in FIGS. 3B and 3C.

The ceramic plate 8 preferably has a square shape of a height and a width respectively of 50–300 mm or a round disc shape of a diameter $\phi$ of 50–300 mm, a thickness of 2–20 mm, and more particularly, has a height and a width respectively of 100–150 mm, a diameter $\phi$ of 100–150 mm, and a thickness of 3–7 mm, from the aspects of the strength of the ceramic plate 8 to resist the cracking thereof, displacement thereof due to its own weight, and the cost thereof.

The ceramic plate can be made of a material selected from alumina, SiC, zirconia, and the like material having a high strength at high temperatures.

The ceramic fiber furnace having the wall structure as mentioned above can prevent displacement of the ceramic plate 8 on the adjacent ceramic fiber board 3, and the ceramic nut 6 itself or the legs 6a of the ceramic nut 6 can slide on the ceramic plate 8, even when the ceramic pin 4 and the ceramic nut 6 threaded therewith are displaced or deformed as shown by the imagination line in FIGS. 1–3 due to thermal expansion or shrinkage of the wall structure caused by ascent or descent of the temperature of the ceramic fiber furnace. Therefore, in the present invention, the prior rubbing of the surface of the ceramic fiber board 3 by the ceramic nut 6 can be prevented, so that the formation or peeling-off of the minute ceramic fibers from the surface of the ceramic fiber board 3 can be assuredly prevented.

Moreover, in the present invention, the wall structure of the ceramic fiber furnace is assuredly held by the resilient power of the spring 5 exerted on the ceramic pin 4 similarly as in the prior furnace, so that the wall structure of the present ceramic fiber furnace can exhibit the same structural strength as that of the prior furnace.

As explained in detail in the foregoings, the formation of the minute ceramic fibers caused by ascent or descent of the ceramic fiber furnace is prevented by substituting the displacement of the ceramic pin and the ceramic nut relative to the ceramic fiber board by the displacement of the ceramic nut relative to the ceramic plate, so that ceramic products which dislike the adhesion of spread minute fibers can be fired in the ceramic fiber furnace of the present invention having a good thermal efficiency. Therefore, the conventionally used muffle furnace needs not be used, and, the investment cost, the running cost, and the firing hours can be decreased substantially.

Accordingly, the present invention provides a ceramic fiber furnace which obviates the prior problems and drawbacks, and contributes to a great extent to the development of the industry.

Although the present invention has been described with reference to specific examples and numerical values, it should be understood that the present invention is not restricted to such examples and numerical values, and numerous changes and modifications are possible without departing from the broad spirit and the aspect of the present invention as defined in the appended claims.

What is claimed is:

1. A ceramic fiber furnace having a furnace wall of a structure composed of a substrate member, a wall of ceramic fibers applied on the inner surface of the substrate member, a ceramic fiber board applied on the inner surface of the wall of the ceramic fibers, and a ceramic pin penetrating through the furnace wall, comprising a ceramic plate interposed between a ceramic nut and the ceramic board, the ceramic plate having a penetration hole which has a larger diameter than the diameter of the ceramic pin for allowing free displacement of the ceramic pin therein.

2. The ceramic fiber furnace of claim 1, wherein the ceramic plate and the ceramic nut have opposing smooth surfaces for facilitating sliding of the ceramic nut on the ceramic plate.

3. The ceramic fiber furnace of claim 1, wherein the ceramic nut has protrusions or recesses formed on the outer surface thereof for facilitating sliding thereof on the ceramic plate.

4. The ceramic fiber furnace of claim 1, wherein the ceramic plate has protrusions or recesses formed on inner surface thereof for facilitating sliding of the ceramic nut thereon.

5. The ceramic fiber furnace of claim 1, wherein the ceramic plate is made of a material selected from alumina, SiC, zirconia, and the like material having a high strength at high temperatures.

* * * * *